Patented Aug. 8, 1950

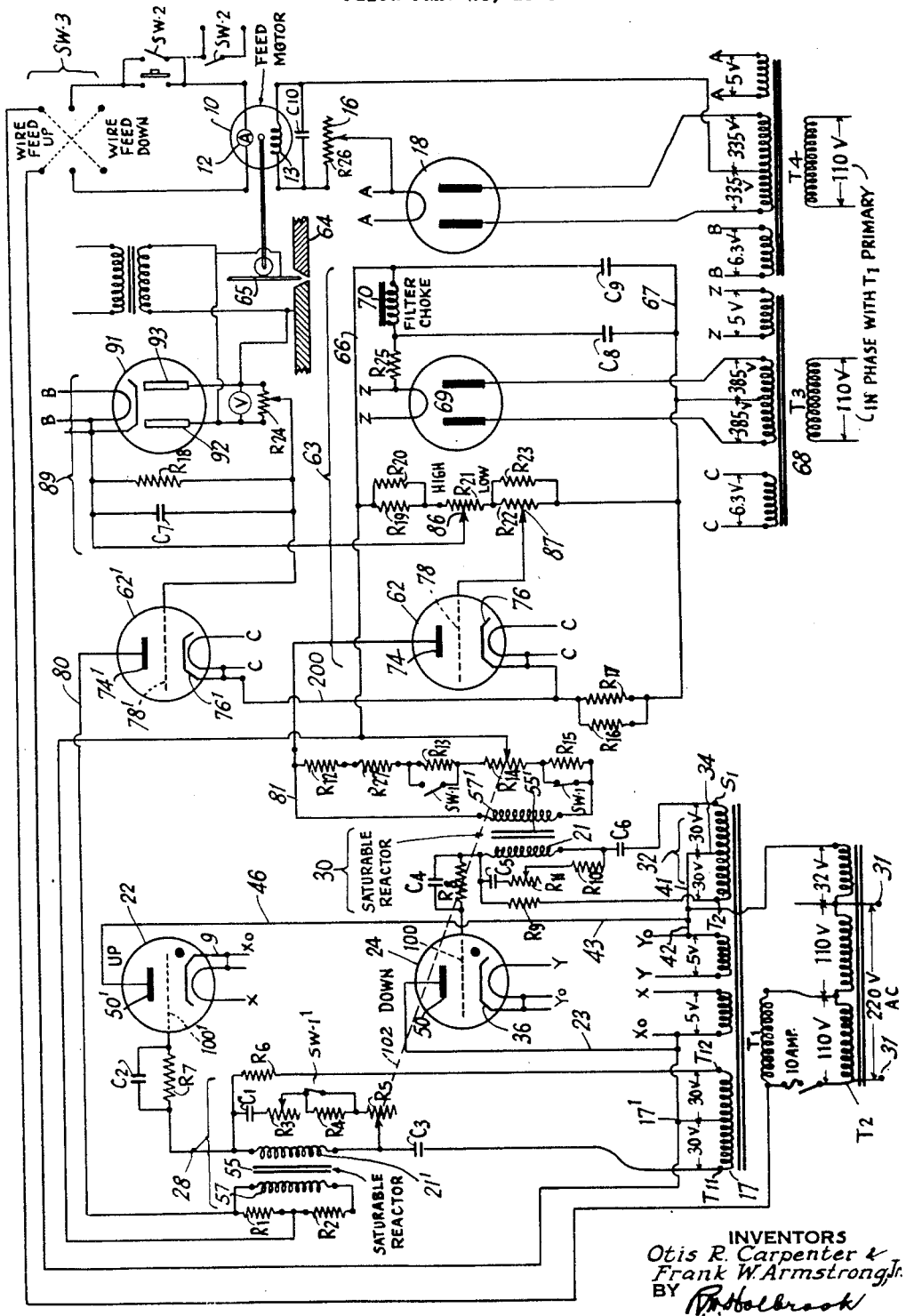

2,518,222

UNITED STATES PATENT OFFICE 2,518,222

ELECTRIC CONTROL SYSTEM

Otis R. Carpenter and Frank W. Armstrong, Jr., Barberton, Ohio, assignors to The Babcock & Wilcox Company, Rockleigh, N. J., a corporation of New Jersey Application January 26, 1945, Serial No. 574,682

9 Claims. (Cl. 318—257)

Our invention relates to electric control circuits, and more particularly to those involving electronic control of a load circuit.

An object to be attained by the invention is the accurate control of the arc in automatic arc welding equipment, and our control system, for this purpose, involves grid controlled rectifiers or thyratrons controlled by excitation circuits including saturable devices. Our control system also provides a voltage sensitive circuit arranged to compensate for the variation in reactance occurring in the saturable devices when welding current demands are increased. The use of our invention makes it possible to maintain arc voltage control within narrow limits, for example plus or minus 1 volt when plate current demands on the electronic motor circuit are high, as, for example, when welding with a current of 2000 or more amperes at the arc. It has been our experience with prior art welding control circuits that, at such high currents, the control loses its sensitivity, or ability to respond to the variables involved, such as load voltage. For example, if such a control permitted variations of plus and minus two volts from a desired value at low current operation, then, at much higher current values, the variations from the desired voltage value might be as high as plus and minus four volts. Such losses of sensitivity of control results in arc length "hunting," and consequent variation in welding voltage from optimum constant value, amounting in some cases to as much as 10 volts or more.

A further object of the invention is to provide an improved welding rod feed control system in which the effectiveness of the saturable devices of the excitation circuits of the upfeed and downfeed thyratrons can be simultaneously so modified as to maintain an optimum sensitivity of the system over a wide control range. Such sensitivity involves the maximum responsiveness of the system to initiate corrective periods of conductance of the thyratrons upon the occurrence of the controlling influence, a voltage change in the arc circuit.

In our control system, thyratrons are connected inversely in parallel so that one will act in a positive "down" direction, while the other acts in a negative "up" direction.

The control of each thyratron is accomplished by a voltage sensitive system including an electric valve of the vacuum type. These systems take over the control of the thyratron circuits within the narrow limits mentioned above and they are coupled to the thyratron circuits through saturable reactors. Each reactor has one winding connected into the grid circuit of the thyratron tube and its other winding connected into the voltage sensitive system. Any change in the output of the latter changes the reactance of a saturable reactor and hence changes the grid voltage of the associated thyratron altering the output of the thyratron accordingly.

For a more thorough understanding of our invention, reference may be made to the following description taken in connection with the accompanying drawing.

The drawing diagrammatically illustrates the application of the control system of this invention to the control of a feed motor 10 of an arc welding machine. This motor is a shunt wound D. C. motor having an armature 12 and a field winding 13. The field is supplied with direct current from a full wave rectifying system. This system includes an alternating current transformer T4, a full wave rectifier tube 18, and a variable resistance 16 for coordinating the motor field voltage with the line voltage.

For supplying current to the armature 12 of feed motor 10, we provide two grid control rectifiers or thyratrons 22 and 24 which are connected to the supply transformer T1 and connected in inverse parallel circuit relation to each other. Thus, when one thyratron passes current the voltage impressed on the armature circuit is of such polarity that the motor runs in the "down" direction. When the other tube passes current, the polarity of the voltage applied to the armature circuit is such as to run the motor in an "up" direction.

The output voltage of the thyratrons 22 and 24 may be controlled by the shift of the phase relationship of the grid control potential with respect to the anode voltage. We provide for the excitation of the grids by means of circuits 28 and 30. The circuit 30 includes the transformer T1 supplied from a 220 volt A. C. line 31 and having the secondary winding 32. This winding has a neutral connection 34 which is joined to the cathode 36 of the thyratron 24 by the connectors 41, 42 Y⁰ and Y and to the anode 50' of the thyratron 22 by the connectors 41, 42 and 46.

The end taps of the transformer secondary winding 32 serve to supply alternating voltage to the excitation or grid circuit 30. This potential is connected in a circuit comprising a resistance R—9, the control winding 21 of a saturable reactor, and the capacitor C—6. For the purpose of so modifying the phase shifting action of the grid circuit 30 as to attain the optimum sensitivity of the control system under initial operative conditions, we provide a control shunt circuit including the capacitor C—5, the variable resistance R—11, and a fixed resistance R—10. Selective setting of the variable resistance R—11 tunes the control winding 21 to its maximum effectiveness, the adjustment of the variable resistance R—11 in the shunt circuit including R—11, C—5, and R—10 providing phase displacement in addition to that normally provided by the circuit elements C—6, R—9 and the control winding 21. This setting of the variable resistance R—11 depends upon the characteristics of the thyratron tube 24, those of the control tubes 62, or the characteristics of other components of the circuit which may vary or be varied. For example, as the age of the thyratron increases, its characteristics change, and such changes can be compensated by the use of the variable control shunt circuit (C—5, R—11, R—10) to attain the optimum control sensitivity of the associated thyratron.

The parallel connected resistance R—8 and capacitance C—4 are connected in series with the control grid 100 of the thyratron 24 and the grid control circuit 30 to serve as a grid current limiter.

The "up" thyratron 22 is also controlled in a similar manner by the grid control circuit 28. This circuit includes a secondary transformer winding 17 which has a neutral connection 17' joined to the anode 50 of the thyratron tube 24 by the conductor 23 and connected to the cathode 9 of the thyratron 22. The secondary winding 17 of transformer T1 is also joined to one side of the circuit of the feed motor armature 12 by double throw switch SW—3.

The end taps T11, T12 of the secondary winding 17 serve to supply alternating current voltage to the excitation circuit 28. This potential is connected in a circuit including a resistance R—6 and an alternating current control winding 21' of a saturable reactor 55 and capacitance C3. For so modifying the phase shifting action of the grid circuit 28 and the associated saturable reactor as to attain the optimum sensitivity of the control system under initial operative conditions, we employ a circuit which has a shunt relation to the winding 21' of the saturable reactor 55 in the circuit 28. This shunt circuit includes a capacitance C1, a variable resistance R—3, and a fixed resistance R—4 having a shunting switch SW—1', and a variable resistance R—5. Selective setting of the variable resistance R—3 so tunes the control winding 21' as to provide for the maximum effectiveness of the excitation circuit 28. The adjustment of the variable resistance R—3 in the grid bias shunt circuit including R—3, C—1 and R—4 provides phase displacement in addition to that normally provided by the circuit elements C—3, R—6 and the control winding 21'.

R—3 is varied to control the inductance value of the coil 21' and to tune it for maximum response of the phase shifting circuit and thereby attain the maximum phase shifting action in the control of the thyratron 22. This is similar to the use of the control resistance R—11 of the excitation circuit 30, in its effect upon the operation of the thyratron 24, and both adjusting grid bias adjusting shunt circuits (one including R—3 and the other including R—11) are used to compensate for influences such as the age of the thyratron and increased current values to attain the optimum control sensitivity of the thyratrons, and hence, of the system.

We provide a voltage sensitive circuit 63 for controlling the excitation circuits 28 and 30 and for controlling the currents conducted by the thyratrons 22 and 24 in accordance with a predetermined controlling influence (the voltage of the arc) variable in accordance with the speed or direction of rotation of motor armature 12. The controlling influence is the arc voltage between the work member 64 and the weldrod 65. The weldrod 65 is fed by the motor 10 and the rate at which the weldrod is fed to the work 64 is dependent upon the speed of the motor. The motor is reversible, and the arc length is controllable in accordance with the arc voltage. The voltage sensitive circuit 63 includes a full wave rectifier 69 and direct current conductors 66 and 67 energized from the transformer 68 in a supply line. A filter choke 70 and a resistance R—25 are connected in series relation with the rectifier 69 as shown, and capacitances C8 and C9 are connected across the conductors 66 and 67 to maintain the voltage across these conductors at substantially constant value.

An electronic tube of the high vacuum type, constituting an electric valve 62, is included in the voltage sensitive circuit 63. It involves an electric discharge path provided by the anode 74, a cathode 76, and the grid 78. Also included in the same circuit is a similar electronic tube or valve 62' having an anode 74', a cathode 76' and a grid 78'. Those tubes are connected and arranged to transmit D. C. to the saturable reactor windings 57 and 57'.

The cathodes 76 and 76' of the tubes 62 and 62' are connected in parallel by the conductor 200. The anodes 74 and 74' are connected to circuits including the conductors 80 and 81, respectively. Conductor 80 transmits unidirectional current to the control winding 57 of the saturable reactor 55 in excitation circuit 28, and the conductor 81 transmits unidirectional current to the control winding 57' of the saturable reactor 55' in excitation circuit 30. The parallel resistances R—16 and R—17 are connected to the cathodes 76 and 76' and in series relation with both of the electric discharge paths of the tubes 62 and 62' to control the potential of the cathodes in accordance with the sum of the currents conducted by the discharge paths of these tubes. Connected between the conductors 66 and 67 is a voltage divider including the resistances R—19, R—20, R—21, R—22, and R—23. As shown, parallel resistances R—19 and R—20 and the parallel resistances R—22 and R—23 are series connected to either side of the variable resistance R—21. The resistance R—21 is provided with an adjustable tap 86 and the resistance R—22 is provided with a tap 87 which is connected to the grid 78 of tube 62. The potential impressed upon the grid 78 is one of substantially constant value. Arc length control of welding is afforded by the adjustment of tap 86.

The circuit 89 is provided for impressing upon the grid 78' of the valve 62' a potential which varies in accordance with the voltage appearing between the weldrod 65 and the work 64. This circuit 89 includes the resistance R—24, the full wave rectifier 91, and a capacitance C7 and a resistance 18 connected in parallel across the output circuit of the rectifier 91. Since the voltage appearing across the terminals of resistance R—18 opposes that obtained from the lower portion of the voltage divider (including resistances R—19—R—23, inc.), the net potential impressed upon the grid 78' will be positive relative to the potential of the cathode 76'.

When the illustrative control system is operating to feed the weldrod 65 toward the work 64 and when the system is responding to maintain the arc length and hence the arc voltage, at a predetermined value, the switch SW—2 is moved to the closed circuit position to impress across the anodes 50 and 50' and the cathodes 9 and 36 of the thyratrons 22 and 24, respectively, alternating voltages through the motor armature 12. Since the thyratrons 22 and 24 are connected inversely in parallel, they serve as electric valves conducting current in opposite directions through the motor armature 12. The excitation circuits 28 and 30 are arranged so that when the saturable reactors 55 and 55' are unsaturated the voltages impressed on the control members 100 and 100' of the thyratrons 24 and 22 are substantially 180 electrical degrees out of phase with respect to voltages impressed across the associated anodes 50 and 50'. The thyratrons 24 and 22 are rendered conductive when the potential impressed on the grids 100 and 100' exceeds a predetermined critical value, and these tubes continue to conduct current for the remaining portion of the positive half cycle for a predetermined length of time thereafter, depending upon the power factor of the loading circuit. The conducting period of the thyratrons 24 and 22 may be less than one-half cycle due to the counter-electromotive force of the feed motor. When there is substantial phase opposition between the voltages upon the grids 100 and 100' and the voltages impressed on the anodes 50 and 50' the average current conducted by the thyratrons or electric valve tubes is substantially zero, and when there is phase coincidence between the voltages impressed upon the control members and the anodes, the average current conducted is at a maximum. For phase relationships between these two extremes, the current conducted by the one or the other of the thyratrons assumes corresponding intermediate values.

The tap 86 of the voltage divider across the conductors 66 and 67 is adjusted so that the potential impressed on the control member 78' is slightly negative when the arc voltage is of predetermined value. The potential impressed upon the control member 78 remains constant and is slightly negative. For a balanced condition, that is when the arc voltage is of predetermined value, the potentials impressed upon the control members 78' and 78 are equal and both slightly negative so that the currents conducted by the parallel paths are equal in value, supplying equal currents to the control windings 57 and 57' of the saturable reactors 55 and 55', respectively. The excitation, or grid circuits 28 and 30 are so adjusted that the motor armature 12 is at a standstill when the arc length is of a predetermined value. To accomplish this result the thyratrons 22 and 24 each conducts current for a corresponding interval of time during each half cycle of applied voltage.

When the illustrative control system is operating, if the arc length increases effecting an increase in the arc voltage, the voltage appearing across the terminals of resistance R—18 will also increase, increasing in a negative direction the voltage impressed upon the control member 78'. This negative increase in voltage may be employed to render the associated discharge path of the tube 62' completely non-conductive. Thus, there is a temporary decrease in current through the resistances R—16 and R—17, and the cathode 76 will become more negative in potential than that under the balanced condition so as to cause this electric discharge path to conduct an increased amount of current. The sum of the currents in the two discharge paths always remains at a substantially constant value differing only by the small difference required to change the voltage across resistances R—16 and R—17 as the cathodes 76 and 76' change in potential, with respect to the fixed control member or grid 78, to achieve a balanced condition. Because of the increase in current in the conductor 81 the saturable reactor 55' in grid circuit 30 will be saturated to effect an advance in phase of the alternating voltage impressed on the control member 100 of the thyratron 24, causing the motor armature 12 to rotate in a direction to decrease the arc length and to restore the arc voltage to the predetermined value. In addition, the phase of the alternating voltage impressed upon the control member 100' of the electric valve tube 22 will be retarded due to the decrease of current in the conductor 80. This unbalanced condition causes the motor armature to be energized to move the weldrod in a direction to decrease the arc length.

A decrease in arc length below the predetermined value causes the voltage appearing across the terminals of the resistance R—18 to decrease correspondingly to increase in the positive direction the potential impressed upon the control member 78' so that the discharge path associated with this control member conducts an increased amount of current slightly greater than the sum of the currents during balanced condition, and the discharge path associated with the grid 78 conducts substantially no current. Consequently, the phase of the voltage impressed on the control member 100 of the thyratron 24 will be retarded to decrease the current conducted thereby, and the phase of the voltage impressed on control member 100' of thyratron 22 will be advanced to increase the current conducted thereby. The net current conducted by the motor armature 12 under these conditions will be in a direction to move the weldrod 65 away from the work 64 to increase the arc length and to restore the arc voltage to the predetermined value.

For the purpose of maintaining the increased sensitivity of the illustrative control system, the resistances R—5 and R—14 are ganged. That is, they are so interconnected that when one is operated the other operates. As the sliding contactor of resistance R—14 is moved upward, the direct current field of the reactor coil 57' decreases, resulting in the corresponding increase of the alternating current field of the control winding 21. This, in turn, causes a corresponding decrease in the phase displacement of control circuit 30, and a consequent control variation of the output of the down thyratron 24. By mechanically connecting the resistances R—5 and R—14, the previously established optimum phase displacement relationship of circuits 28 and 30 (obtained, for example, by the adjustment of the resistances R—3 and R—11 as previously explained) is maintained at optimum value. As the phase displacement in the circuit 30 changes, a corresponding change occurs in the circuit 28 by virtue of the common connection 200 of the cathodes 76 and 76' of control tubes 62 and 62', compensation therefor being effected by the compensating means which includes the phase adjusting components R—5 and R—14 and the connection providing for their simultaneous operation.

The switch SW—1 is connected across the resistance R—4 as well as resistances R—13 and R—15 to provide a shunt path which allows wide operation ranges. When resistances R—15 and R—4 are shunted out as shown in the drawings and only resistance R—13 is in the circuit, the upper range of the control system is materially increased. When the resistances R—15 and R—4 are in the circuit, and the resistance R—13 is shunted out, additional phase displacement of the grid circuit 28 is provided to compensate for the decrease in phase displacement of the grid circuit 30, thereby increasing the lower range of the control.

By the above described interlocking of the control resistance of both the "up" (28) and the "down" (30) excitation circuits, a wide range of accurate control of the arc length is afforded and all hunting of the arc is substantially eliminated, particularly, during employment of heavy welding currents. By the described means, we interlock the sensitivity of the excitation circuits 28 and 30 of the thyratrons in such a manner that as the reactance of these circuits (the A. C. sides of the saturable reactors) changes due to heavy current demands, we maintain corresponding shifts in the D. C. side (coils 57 and 57') of the saturable reactors.

Our control system responds not only to control the direction of rotation of the motor armature 12, but also responds to control the speed of the motor during the adjusting operation by virtue of the control of the direction and magnitude of the resulting current conducted to the armature 12 by the electric valve tubes 22 and 24.

What is claimed is:

1. In an electric control system including an alternating current supply circuit, a load circuit, a pair of electric valve means inversely connected in parallel and operatively connected to the load circuit for controlling the magnitude and the direction of the average direct current transmitted to said load circuit from said supply circuit, each of said electric valve means having a grid for controlling the conductivity thereof, a pair of excitation circuits for impressing on said grids alternating voltages and each including the alternating current coil of a separate saturable reactor for controlling the phase of said alternating voltages, and a voltage sensitive circuit including the direct current coils of the saturable reactors and arranged for controlling said saturable reactors for shifting the phase of said alternating voltages in opposite directions with respect to the voltage of said supply circuit; compensating means effective to compensate for variations in the constants of said reactors under different operating conditions, said compensating means including a variable resistance in circuit relation with the alternating current coil of one reactor, a variable resistance in circuit with the direct current coil of the other reactor, and coupling means interconnecting said variable resistances and operable to vary the same, in value, simultaneously in opposite directions.

2. In an electric control system, an alternating current supply circuit, a load circuit, two electric valve means reversely connected in parallel for controlling the magnitude and direction of the average direct current transmitted to said load circuit from said supply circuit, each of said electric valve means having a grid for controlling the conductivity thereof, an excitation circuit for each of said valve means energized from said alternating current source and impressing alternating voltages on the grids, each of said excitation circuits including the alternating current coil of a separate saturable reactor for controlling the phase of said alternating voltages, a voltage sensitive direct current circuit including the direct current coils of said saturable reactors for causing the excitation circuits to shift the phase of said alternating voltages in opposite directions with respect to the voltage of said supply circuit, each excitation circuit also having an adjustable control resistance disposed in a grid bias adjustable shunt across its reactor power coil, for so modifying the phase shifting action of the excitation circuits to attain optimum sensitivity of the system under initial operative conditions, a variable control resistance disposed in the voltage sensitive circuit and effective on the direct current coils of both saturable reactors, and means coupling one of the first mentioned variable resistances with the control resistance in the voltage sensitive circuit for simultaneous variation in opposite senses to maintain a corresponding shift on the direct current sides of the reactors when a change is made in the reactance on the alternating current side, said means in combination with said control and variable resistances constituting parts of an interlocking phase displacement system for the control elements of said valve means.

3. In an electric control system, an alternating current supply source, a load circuit, two thyratrons inversely connected in parallel and operatively connected to the load circuit for controlling the magnitude and the direction of the average direct current transmitted through said load circuit, said thyratrons each having a grid for controlling the conductivity thereof, a pair of excitation circuits energized by said source for impressing on said grids alternating voltages and each including the alternating current coil of a separate saturable reactor for controlling the phase of said alternating voltages, a voltage sensitive direct current circuit including the direct current coils of said saturable reactors and arranged for controlling said saturable reactors for shifting the phase of said alternating voltages in opposite directions with respect to the voltage of said supply circuit, said voltage sensitive circuit and the excitation circuits each including an adjustable control resistance with the control resistance in the voltage sensitive circuit effective on the direct current coils of both saturable reactors, the control resistance for each excitation circuit being included in a grid bias adjusting shunt across the alternating current coil of its saturable reactor, a range shifter including a fourth resistance in the adjustable shunt of one of the circuits and a fifth resistance in shunt relation to said control resistance in the voltage sensitive circuit, said range shifter involving switch means operable to simultaneously shunt out the fourth resistance and place the fifth resistance in said shunt in the voltage sensitive circuit to materially increase the upper range of the control system, and a phase displacement interlock between the control resistance in said voltage sensitive circuit and the control resistance in one of said excitation circuits, said interlock including a coupling of said last mentioned control resistances causing their simultaneous variation in value in opposite directions to maintain a corresponding shift on the direct current sides of the reactors when the range shifter has made a change in reactance on the alternating current side.

4. In an electric control system, an alternating current supply source, a load circuit, two thyratrons inversely connected in parallel and operatively connected to the load circuit for controlling the magnitude and the direction of the average direct current transmitted through said load circuit, said thyratrons each having a grid for controlling the conductivity thereof, a pair of excitation circuits energized by said source for impressing on said grids alternating voltages and each including the alternating current coil of a separate saturable reactor for controlling the phase of said alternating voltages, a voltage sensitive direct current circuit including the direct current coils of said saturable reactors and arranged for controlling said saturable reactors for shifting the phase of said alternating voltages in opposite directions with respect to the voltage of said supply circuit, said voltage sensitive circuit and the excitation circuits each including an adjustable control resistance with the control resistance in the voltage sensitive circuit effective on the direct current coils of both saturable reactors, the control resistance for each excitation circuit being included in a grid bias adjusting shunt across the alternating current coil of its saturable reactor, a range shifter including a fourth resistance adapted to be connected into the adjustable shunt of one of the excitation circuits and a sixth resistance adapted to be placed selectively in series with the voltage sensitive circuit, said range shifter also involving switch means operable to simultaneously shunt out the fourth resistance and the sixth resistance to increase the upper range of the control system, and a phase displacement interlock between the control resistance in said voltage sensitive circuit and the control resistance in one of said excitation circuits, said interlock including a coupling of said last mentioned control resistances causing their simultaneous variation in value in opposite directions to maintain a corresponding shift on the direct current sides of the reactors when the range shifter has made a change in reactance on the alternating current side.

5. In an electric control system, an alternating current supply source, a load circuit, two thyratrons inversely connected in parallel and operatively connected to the load circuit for controlling the magnitude and the direction of the average direct current transmitted through said load circuit, said thyratrons each having a grid for controlling the conductivity thereof, a pair of excitation circuits energized by said source for impressing on said grids alternating voltages and each including the alternating current coil of a separate saturable reactor for controlling the phase of said alternating voltages, a voltage sensitive direct current circuit including the direct current coils of said saturable reactors and arranged for controlling said saturable reactors for shifting the phase of said alternating voltages in opposite directions with respect to the voltage of said supply circuit, said voltage sensitive circuit and the excitation circuits each including an adjustable control resistance with the control resistance in the voltage sensitive circuit effective on the direct current coils of both saturable reactors, the control resistance for each excitation circuit being included in a grid bias adjusting shunt across the alternating current coil of its saturable reactor, a range shifter including a fourth resistance adapted to be selectively connected into the adjustable shunt of one of the excitation circuits, a fifth resistance adapted to be connected into shunt relation to said control resistance in the voltage sensitive circuit, said range shifter also including a sixth resistance adapted to be selectively connected in series into or shunted out of the voltage sensitive circuit, and switch means operatively associated with said fourth, fifth and sixth resistances to simultaneously shunt out the fourth and sixth resistances and cut in the fifth resistance to increase the upper range of the control system, and a phase displacement interlock between the control resistance in said voltage sensitive circuit and the control resistance in one of said excitation circuits, said interlock including a coupling of said last mentioned control resistances causing their simultaneous variation in value in opposite directions to maintain a corresponding shift on the direct current sides of the reactors when the range shifter has made a change in reactance on the alternating current side.

6. In an electrical system, a load circuit including an electric motor, a second circuit the voltage of which is subject to variation, a source of alternating current, an electronic voltage control system involving a voltage sensitive circuit interposed relative to said source and the motor and acting to maintain the voltage of said second circuit within plus or minus one-half volt of a predetermined optimum value; said electronic system including two thyratrons connected inversely in parallel, two grid circuits energized from said source and connected respectively with the grids of the thyratrons, saturable reactors each having its alternating current coil in a separate grid circuit, each reactor having its alternating current coil in one of the grid circuits, an electronic circuit sub-system having its current varied by voltage changes in said second circuit and having the direct current coils of said saturable reactors included therein, a grid bias adjustable shunt across each of the alternating current coils of the saturable reactors, each of said shunts including a variable resistance, another variable resistance connected in said sub-system in circuit relation with the direct current coils of the saturable reactors, a motor speed regulator interlocking said system and operable to simultaneously and inversely vary in value one of said first-named variable resistances and said other variable resistance in circuit on the direct current sides of the saturable reactor, and a phase displacement Hi-Lo range shifting system including fixed resistance in the D. C. circuits of said reactors and a fixed resistor in the A. C. circuit of one reactor, means selectively operable to shunt each of said fixed resistances, and means interconnecting said shunting means and operable to simultaneously shunt a resistance in one circuit and remove the shunt from a resistance in the other circuit.

7. In an electric control system of the type having a voltage sensitive circuit and a pair of electric valve means reversely connected in parallel to control the direction and magnitude of a unidirectional current, each of said valve means having a grid for controlling the conductivity thereof, a pair of grid excitation circuits each including a saturable reactor having its direct current coil connected into said voltage sensitive circuit and its alternating current coil connected into a separate grid excitation circuit, the first of said saturable reactors having a variable resistance in series with a fixed resistance in a shunt across its alternating current coil, the second of said saturable reactors having fixed resistances on opposite sides of and in series with a variable resistance in the voltage sensitive circuit with some of said resistances forming a shunt around the direct current coil of the second reactor, and a mechanical interlock between the variable resistances in both saturable reactor circuits for their simultaneous adjustment in predetermined inverse relationship to vary the magnitude of said unidirectional current in one direction to maintain the optimum sensitivity of said valves to changes in the voltage sensitive circuit.

8. In an electric control system of the type having a voltage sensitive circuit and a pair of electric valve means reversely connected in parallel to control the direction and magnitude of a unidirectional current, each of said valve means having a grid for controlling the conductivity thereof, a pair of grid excitation circuits each including a saturable reactor having its direct current coil connected into said voltage sensitive circuit and its alternating current coil connected into a separate grid excitation circuit, the first of said saturable reactors having a variable resistance in series with a fixed resistance in a shunt across its alternating current coil, the second of said saturable reactors having fixed resistances on opposite sides of and in series with a variable resistance in the voltage sensitive circuit with some of said resistances forming a shunt around the direct current coil of the second reactor, and Hi-Lo range shifting switch means connecting at least some of said fixed resistances on opposite sides of a saturable reactor and arranged to simultaneously alter the electrical effect of the shunts of both saturable reactors by predetermined fixed amounts to change the magnitude range of said unidirectional current flow while maintaining the sensitivity of said valves to changes in the voltage sensitive circuit.

9. In an electric control system of the type having a voltage sensitive circuit and a pair of electric valve means reversely connected in parallel to control the direction and magnitude of a unidirectional current, each of said valve means having a grid for controlling the conductivity thereof, a pair of grid excitation circuits each including a saturable reactor having its direct current coil connected into said voltage sensitive circuit and its alternating current coil connected into a separate grid excitation circuit, the first of said saturable reactors having a variable resistance in series with a fixed resistance in a shunt across its alternating current coil, the second of said saturable reactors having fixed resistances on opposite sides of and in series with a variable resistance in a shunt across its direct current coil, a mechanical interlock between the variable resistances in both saturable reactor circuits for their simultaneous adjustment in predetermined inverse relationship to vary the magnitude of said unidirectional current in one direction while maintaining the sensitivity of said valves to changes in the voltage sensitive circuit, and Hi-Lo range shifting switch means connecting at least some of said fixed resistances on opposite sides of a saturable reactor and arranged to simultaneously alter the electrical effect of the shunts of both saturable reactors by predetermined fixed amounts to change the magnitude range of said unidirectional current flow while maintaining the sensitivity of said valves to changes in the voltage sensitive circuit.

OTIS R. CARPENTER.
FRANK W. ARMSTRONG, Jr.

REFERENCES CITED

The following references are of record in the file of this patent:

UNITED STATES PATENTS

| Number | Name | Date |
|---|---|---|
| 2,175,009 | Anderson | Oct. 3, 1939 |
| 2,175,017 | Cockrell | Oct. 3, 1939 |
| 2,260,510 | Clapp | Oct. 28, 1941 |
| 2,288,295 | Moyer et al. | June 30, 1942 |
| 2,329,127 | Levy | Sept. 7, 1943 |
| 2,348,259 | Keatz | May 9, 1944 |